United States Patent
Lee et al.

(10) Patent No.: US 10,913,486 B2
(45) Date of Patent: Feb. 9, 2021

(54) STEERING APPARATUS, STEERING METHOD, AND STEERING CONTROL DEVICE

(71) Applicant: MANDO CORPORATION, Gyeonggi-do (KR)

(72) Inventors: Jong Hoon Lee, Incheon (KR); Jong Hak Jin, Gyeonggi-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 0 days.

(21) Appl. No.: 16/578,224

(22) Filed: Sep. 20, 2019

(65) Prior Publication Data
US 2020/0094871 A1 Mar. 26, 2020

(30) Foreign Application Priority Data
Sep. 21, 2018 (KR) .......... 10-2018-0114259

(51) Int. Cl.
*B62D 5/04* (2006.01)
*H02P 29/028* (2016.01)
(Continued)

(52) U.S. Cl.
CPC ......... *B62D 5/0463* (2013.01); *B62D 5/0481* (2013.01); *H02P 25/22* (2013.01); *H02P 29/028* (2013.01); *H02P 29/0243* (2016.02)

(58) Field of Classification Search
CPC ............... H02P 29/028; H02P 25/22
(Continued)

(56) References Cited

U.S. PATENT DOCUMENTS 8,294,395 B2 * 10/2012 Kimpara ............... B62D 5/046
318/400.02
8,981,704 B2 * 3/2015 Endo ..................... B62D 5/046
318/400.01
(Continued)

FOREIGN PATENT DOCUMENTS

| JP | 2009-208672 | 9/2009 |
| KR | 10-2006-0083578 | 7/2006 |
| KR | 10-2018-0095355 | 8/2018 |

OTHER PUBLICATIONS

Office Action dated Oct. 2, 2019 for Korean Patent Application No. 10-2018-0114259 and its English machine translation by Google Translate.

*Primary Examiner* — David Luo
(74) *Attorney, Agent, or Firm* — Ladas & Parry, LLP

(57) ABSTRACT

A steering apparatus, a steering method, and a steering control device. A steering motor includes a first winding and a second winding respectively receiving three-phase power. A first steering controller controls the power supplied to the first winding. A second steering controller controls the power supplied to the second winding. A detector detects whether or not a phase among three phases corresponding to each of the first and second windings is open; and a controller. If the phase among the three phases is detected to be open, the controller controls one steering controller corresponding to the open phase, among the first steering controller and the second steering controller, in accordance with an angular velocity of a steering wheel and the rotational speed of the steering motor, so that the steering motor generates additional torque.

15 Claims, 8 Drawing Sheets

(51) Int. Cl.
*H02P 29/024* (2016.01)
*H02P 25/22* (2006.01)

(58) Field of Classification Search
USPC .......................................... 318/496, 495, 494
See application file for complete search history.

(56) References Cited

U.S. PATENT DOCUMENTS 9,780,712 B2 * 10/2017 Mori ....................... B62D 5/046
10,486,735 B2 * 11/2019 Fujita ....................... G01B 7/30

* cited by examiner

STEERING APPARATUS, STEERING METHOD, AND STEERING CONTROL DEVICE

CROSS REFERENCE TO RELATED APPLICATION

This application claims priority from Korean Patent Application No. 10-2018-0114259, filed on Sep. 21, 2018, which is hereby incorporated by reference for all purposes as if fully set forth herein.

BACKGROUND

Field

Embodiments relate to a steering apparatus, a steering method, and a steering control device.

Description of Related Art

In an electric power assisted steering (EPS) system, a motor rotates using electrical energy to provide assistance steering power when torque is generated by rotation of a steering wheel. That is, the EPS system can suitably vary the steering power of the steering wheel using the motor in response to a traveling speed of a vehicle, so that the steering effort can be adjusted to be relatively light during parking or low speed driving and to be relatively heavy during high speed driving in order to provide high speed driving stability.

Most functions performed by the EPS system are controlled by an electronic control unit (ECU).

However, windings in the motor may be subject to short-circuits, due to fabrication defects, heat generated by high power consumption, cumulative vibrations, and the like. Failures may occur due to a variety of reasons, such as aging of the motor or sparks, other than short-circuits. When a winding in the motor has failed due to any of the above-mentioned reasons, the circuit of the motor or the electronic control unit (ECU) may frequently be damaged, which is problematic.

In order to solve this problem, a dual winding motor has been used. Such a dual winding motor is controlled so that two windings operate separately, thereby improving the availability of the EPS system. That is, in the dual winding motor, each winding generates 50% of the entire output power, so that, even in the case in which one winding malfunctions, the other winding can generate 50% of the entire output power, so that the actuation of the motor can be properly maintained.

However, in a situation in which the output power is maintained using a single winding, an increase in the rotational speed of the motor may cause a decrease in output power due to counter electromotive force of the steering motor, so that assistance steering power may not be ordinarily provided, which is problematic.

BRIEF SUMMARY

Various aspects provide a steering apparatus and method in which, in a situation in which a coil of one phase is open due to a failure of one winding and steering is performed in a high speed range, a steering controller can control a steering motor to generate additional torque using the remaining coils of the one winding, other than the failed coil.

According to an aspect, provided is a steering apparatus including: a steering motor including a first winding and a second winding respectively receiving three-phase power; a first steering controller controlling the power supplied to the first winding; a second steering controller controlling the power supplied to the second winding; a detector detecting whether or not a phase among three phases corresponding to each of the first and second windings is open; and a controller. If the phase among the three phases is detected to be open, the controller may control one steering controller corresponding to the open phase, among the first steering controller and the second steering controller, in accordance with an angular velocity of a steering wheel and the rotational speed of the steering motor, so that the steering motor generates additional torque.

According to another aspect, provided is a method including: detecting whether or not a phase among three phases corresponding to each of a first winding and a second winding in a steering motor is open, the first winding and the second winding respectively receiving three-phase power; and if the phase is detected to be open, controlling a steering controller corresponding to the open phase, among steering controllers controlling the power supplied to the first winding and the second winding, in accordance with an angular velocity of a steering wheel and a rotational speed of the steering motor, so that the steering motor generates additional torque.

According to another aspect, provided is a steering control device including: a detector detecting whether or not any phase among three phases corresponding to each of a first winding and a second winding in a steering motor is open, the first winding and the second winding respectively receiving three-phase power; and a controller, if one phase is detected to be open, controlling a steering controller corresponding to the open phase, among steering controllers controlling the power supplied to the first winding and the second winding, in accordance with an angular velocity of a steering wheel and a rotational speed of the steering motor, so that the steering motor generates additional torque.

According to exemplary embodiments, in a situation in which one phase among three phases of the motor including a plurality of windings is open and steering is performed in a high speed rotation range, additional torque corresponding to torque of the open phase can be generated using the remaining two phases, thereby improving steering stability.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

The present disclosure provides a steering apparatus, a method performed by the steering apparatus, and a steering control device.

In the following description of examples or embodiments of the present disclosure, reference will be made to the accompanying drawings in which it is shown by way of illustration specific examples or embodiments that can be implemented. Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

Figure 1:
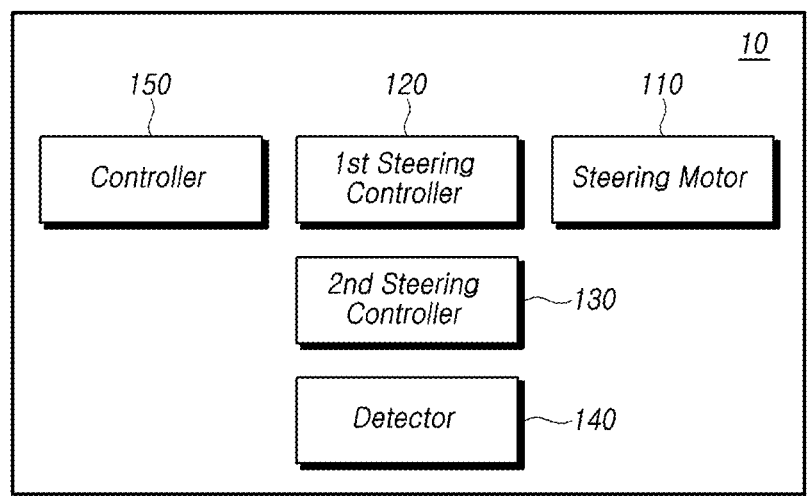
FIG. 1 is a block diagram illustrating a configuration of a steering apparatus according to an embodiment of the disclosure.

FIG. 1 is a block diagram illustrating a configuration of a steering apparatus according to an embodiment of the disclosure.

Referring to FIG. 1, the steering apparatus 10 according to the disclosure includes a steering motor 110, a first steering controller 120, a second steering controller 130, a detector 140, and a controller 150. The steering motor 110 includes a first winding and a second winding respectively receiving three-phase power. The first steering controller 120 controls the power supplied to the first winding, while the second steering controller 130 controls the power supplied to the second winding. The detector 140 detects whether or not any phase among three phases corresponding to each of the first and second windings is open. If one phase among the three phases is detected to be open, the controller 150 controls one steering controller corresponding to the open phase, among the first steering controller 120 and the second steering controller 130, in accordance with an angular velocity of a steering wheel and the rotational speed of the steering motor 110, so that the steering motor 110 can generate additional torque.

The steering apparatus 10 according to the disclosure includes the steering motor 110 including the first winding and the second winding to which three-phase power is applied. A motor comprised of two windings, which are controlled to separately operate, is generally referred to as a dual winding motor. The steering motor according to the disclosure includes a dual winding motor.

The steering apparatus 10 according to the disclosure includes the first steering controller 120 controlling the power supplied to the first winding and the second steering controller 130 controlling the power supplied to the second winding. Each of the first steering controller and the second steering controller are electrically connected to the steering motor. The first steering controller and the second steering controller may be directly connected to the steering motor or may be indirectly connected to the steering motor via a separate component protecting the steering motor, such as a circuit. The first steering controller and the second steering controller convert a DC voltage, input from a DC power source, into an AC voltage, by which the steering motor is actuated, and control the operation of the steering motor by the on/off operation of a plurality of semiconductor switching elements provided therein.

The steering apparatus 10 according to the disclosure includes the detector 140 detecting whether or not any phase among the three phases corresponding to each of the first and second windings is open. The detector may use a gate driver to detect whether or not each phase among the three phases corresponding to each of the first and second windings is open. For example, opening of one phase of the three phases may be a short-circuit of a coil corresponding on the one phase among a plurality of coils, or a short circuit of a line, through which power is supplied to the corresponding coil. However, the disclosure is not limited thereto. The technical concepts of the disclosure may be used in any situations in which power is not supplied since one or more phases in a three-phase circuit corresponding to the first winding or the second winding have failed. Alternatively, the detector may be a gate driver detecting whether or not any coil among the plurality of coils of each windings is open. A specific method of detecting the opening of the coils by the gate driver may be performed any method well known in the art. Since those skilled in the art may realize such a method using common knowledge, specific descriptions thereof will be omitted.

The steering apparatus 10 according to the disclosure includes the controller 150. If one phase among the three phases is detected to be open, the controller 150 controls one steering controller corresponding to the open phase, among the first steering controller 120 and the second steering controller 130, in accordance with an angular velocity of a steering wheel and the rotational speed of the steering motor 110, so that the steering motor 110 can generate additional torque.

If one phase among the three phases is detected to be open, the controller 150 according to the disclosure may determine the winding including the open phase and specify the steering controller corresponding to the determined winding. Afterwards, the controller may review information regarding the angular velocity of the steering wheel and information regarding the rotational speed of the steering motor, and if the information regarding the angular velocity of the steering wheel and the information regarding the rotational speed of the steering motor satisfy specific conditions, control the steering controller corresponding to the open phase so that the steering motor can generate auxiliary torque.

According to an embodiment, if one phase among the three phases is detected to be open, the controller 150 according to the disclosure may determine a steering state in accordance with the angular velocity of the steering wheel. If the steering state is rapid steering, the controller 150 may determine the rotational speed of the steering motor is in a high rotational speed range. If the rotational speed of the steering motor is determined to be in the high rotational speed range, the controller 150 may control the steering controller corresponding to the open phase so that the steering motor can generate auxiliary torque.

In an example, the controller 150 may determine that the steering state of the steering apparatus is rapid steering if the angular velocity of the steering wheel is higher than a first threshold value. Here, the first threshold value is a predetermined value. The steering apparatus may include an angular velocity sensor, which may obtain the angular velocity of the steering wheel by detecting an angular velocity applied to the steering wheel.

In addition, according to an embodiment, the controller 150 may determine the steering state of the steering apparatus in accordance with the torque of the steering wheel. In other words, if one phase is detected to be open, the controller may control the steering controller corresponding to the open phase in accordance with the angular velocity of the steering wheel and the rotational speed of the steering motor, so that the steering motor can generate additional torque.

In another example, if the rotational speed of the steering motor is detected to be higher than a second threshold value, the controller 150 of the steering apparatus according to the disclosure may determine that the rotational speed of the steering motor is in the high rotational speed range. If the rotational speed of the steering motor is detected to be not higher than the second threshold value, the controller 150 of the steering apparatus according to the disclosure may determine the rotational speed of the steering motor to be in a low rotational speed range. The rotational speed of the steering motor may be obtained by calculating a pulse signal entering from a motor position sensor. The second threshold value serving as a reference, by which the high rotational speed range and the low rotational speed range are divided, may be set to be a value at which torque starts to be reduced due to counter electromotive force of the steering motor. For example, the second threshold value may be set to be a value of rated torque of the steering motor.

If the rotational speed of the steering motor is determined to be in the high rotational speed range, the controller 150 may control the steering controller corresponding to the open phase so that the steering motor can generate additional torque using the remaining two phases, other than the open phase, among the three phases including the open phase. The magnitude of the additional torque generated by the steering motor may vary in accordance with the rotational speed of the steering motor. For example, the additional torque generated by the steering motor when the speed of the steering motor is 2000 rpm may be smaller than the additional torque generated by the steering motor when the speed of the steering motor is 2500 rpm.

According to an embodiment, the controller 150 according to the disclosure controls the steering controller corresponding to the open phase so that the steering motor generates the additional torque in accordance with torque generated by the normal steering controller, other than the steering controller corresponding to the open phase, and the rotational speed of the steering motor. Here, the value of the additional torque may correspond to a value obtained by subtracting a torque value, generated by the normal steering controller at the current rotational speed of the steering motor, from a maximum torque value, generated by the normal steering controller. In other words, the value of the additional torque added by the steering motor may be set to be the torque value reduced from the maximum torque value due to counter electromotive force of the steering motor.

According to the present disclosure, in a situation in which one phase among the three phases of a steering motor including a plurality of windings is open, power is supplied to the steering motor using the remaining two phases among the three phases including the open phase, so that the steering motor can generate additional torque. Accordingly, even in the case in which power is supplied from a single winding, a torque value lost by an increase in the rotational speed of the steering motor can be preserved in order to assist in output power of the steering motor, thereby improving steering stability.

Figure 2:
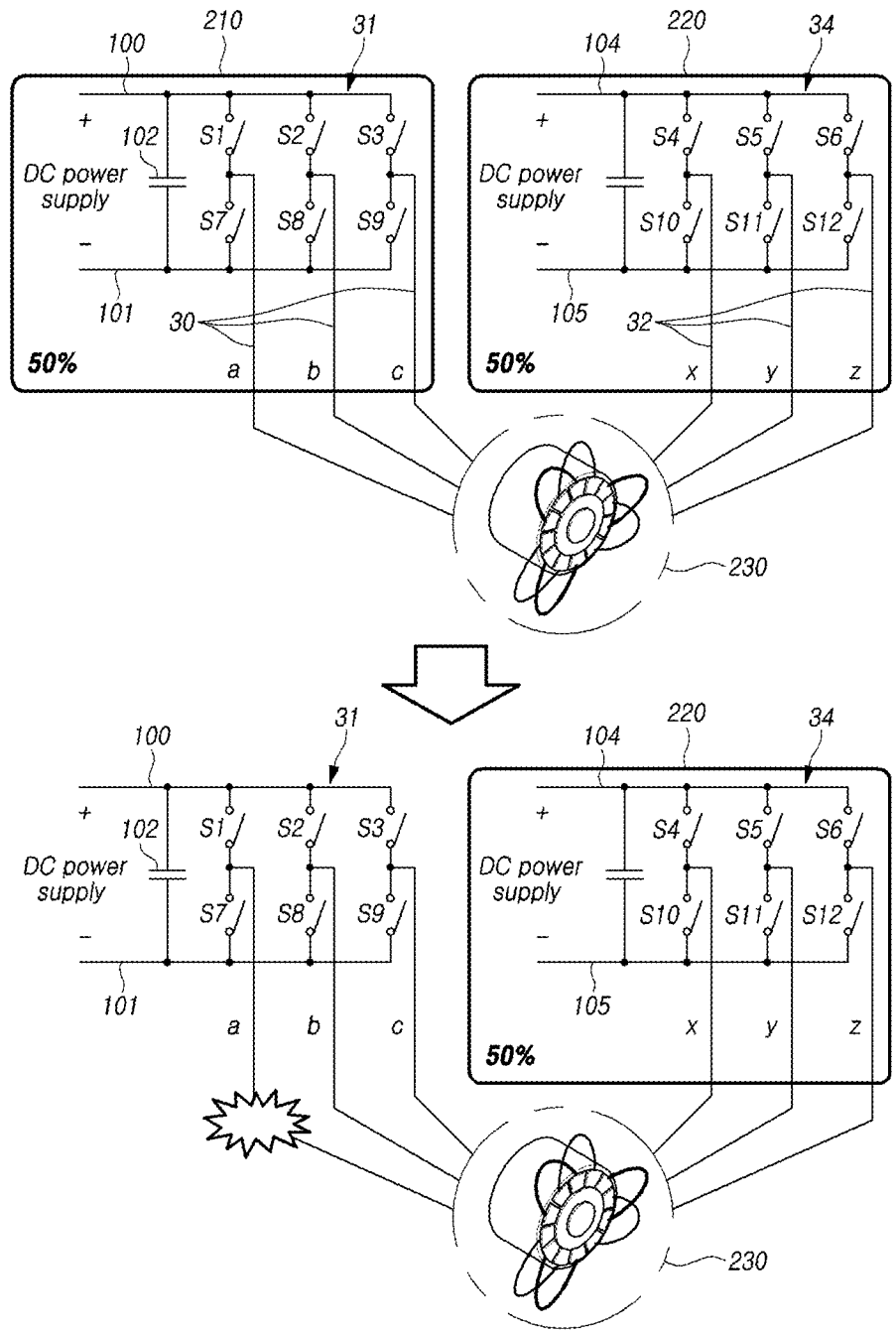
FIG. 2 is a diagram illustrating a situation in which one phase among three phases corresponding to a single winding of the steering motor is open.
Figure 3:
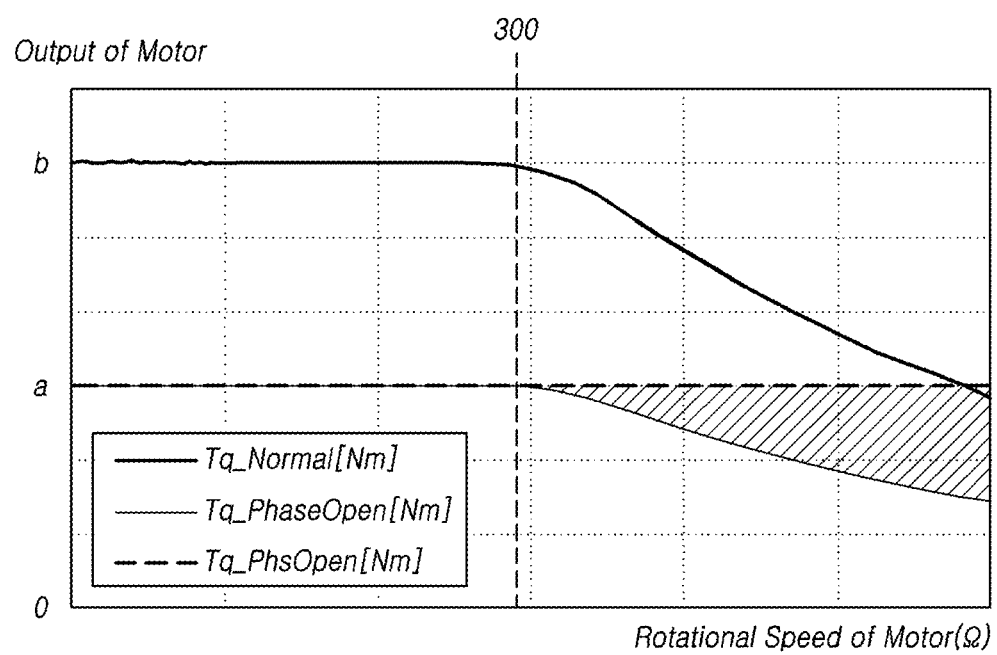
FIG. 3 is a graph illustrating additional torque generated by the steering motor according to an embodiment of the disclosure.

FIG. 2 is a diagram illustrating a situation in which one phase among three phases corresponding to a single winding of the steering motor is open, and FIG. 3 is a graph illustrating additional torque generated by the steering motor according to an embodiment of the disclosure.

Referring to FIGS. 2 and 3, in the steering apparatus according to the disclosure, the actuation of the steering motor is controlled so that the two windings operate separately. Three-phase power is applied to the steering motor via each of the windings. This configuration may be reviewed from the steering apparatus illustrated in the top part of FIG. 2. The steering motor 230 is configured such that each winding generates 50% of the entire output power, and power supplied to the windings is controlled by the steering controllers 210 and 220. However, if the rotational speed of the steering motor 230 is high, torque starts to decrease after having passed through a threshold value point, due to counter electromotive force steering motor 230. For example, referring to the graph in FIG. 3, if the rotational speed of the steering motor 230 is higher than a threshold value 300, the entire torque of the steering motor starts to decrease (see a solid line Tq_Normal in the graph in FIG. 3).

In addition, in a steering motor of the related art, if one winding of two windings has failed, e.g. the coil corresponding to phase a in the bottom part in FIG. 2, among the windings of the motor, is open, the steering motor is controlled using the steering controller corresponding to the normal winding. Consequently, in the operation of the steering system, the entire output thereof is 50%, including an output 50% generated by the normal winding and an output 0% generated by the failed winding. That is, as illustrated in FIG. 3, the steering system operates so that an output generated by the two windings ordinarily operating is b. However, if one phase corresponding to one winding is open, the output of the motor is a, i.e. 50% of b. Here, as described above, if the rotational speed of the steering motor 230 is high, the torque starts to decrease after having passed the threshold value point due to counter electromotive force of the steering motor 230 (see a line Tq_PhaseOpen in the graph in FIG. 3). In this case, a sufficient amount of torque may not be generated by the output of a single steering controller.

In the steering apparatus according to the disclosure, if the detector has detected that one phase among the three phases, corresponding to one winding of the steering motor, is open, e.g. one phase corresponding to the winding controlled by the steering controller 210 is detected to be open, the controller controls the steering controller 210 in accordance with the angular velocity of the steering wheel and the rotational speed of the steering motor 230 so that the steering motor 230 can generate additional torque. Accordingly, even in the case in which steering is performed while the steering motor 230 is rotating in the high rotational speed range, the torque value of the steering motor 230 may be maintained within a torque value at a rotational speed in the low rotational speed range or the maximum torque value that can be generated by the steering controller 220 (see a dotted line Tq_PhsOpen in the graph in FIG. 3).

Figure 4:
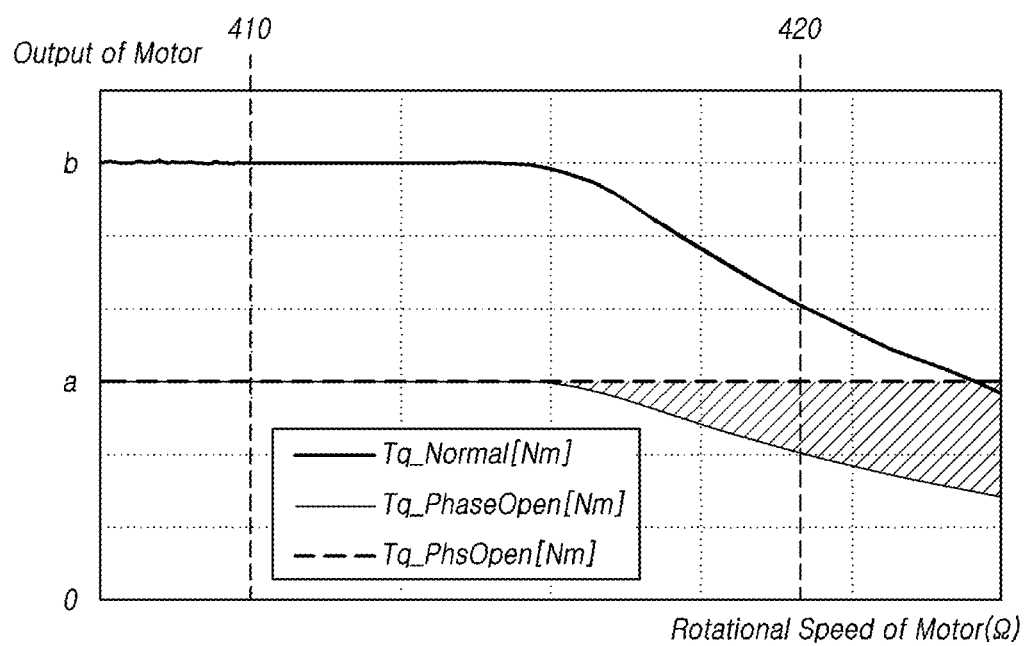
FIG. 4 is a graph illustrating torque generated by the steering motor in accordance with the rotational speed of the steering motor according to an embodiment of the disclosure.
Figure 5:
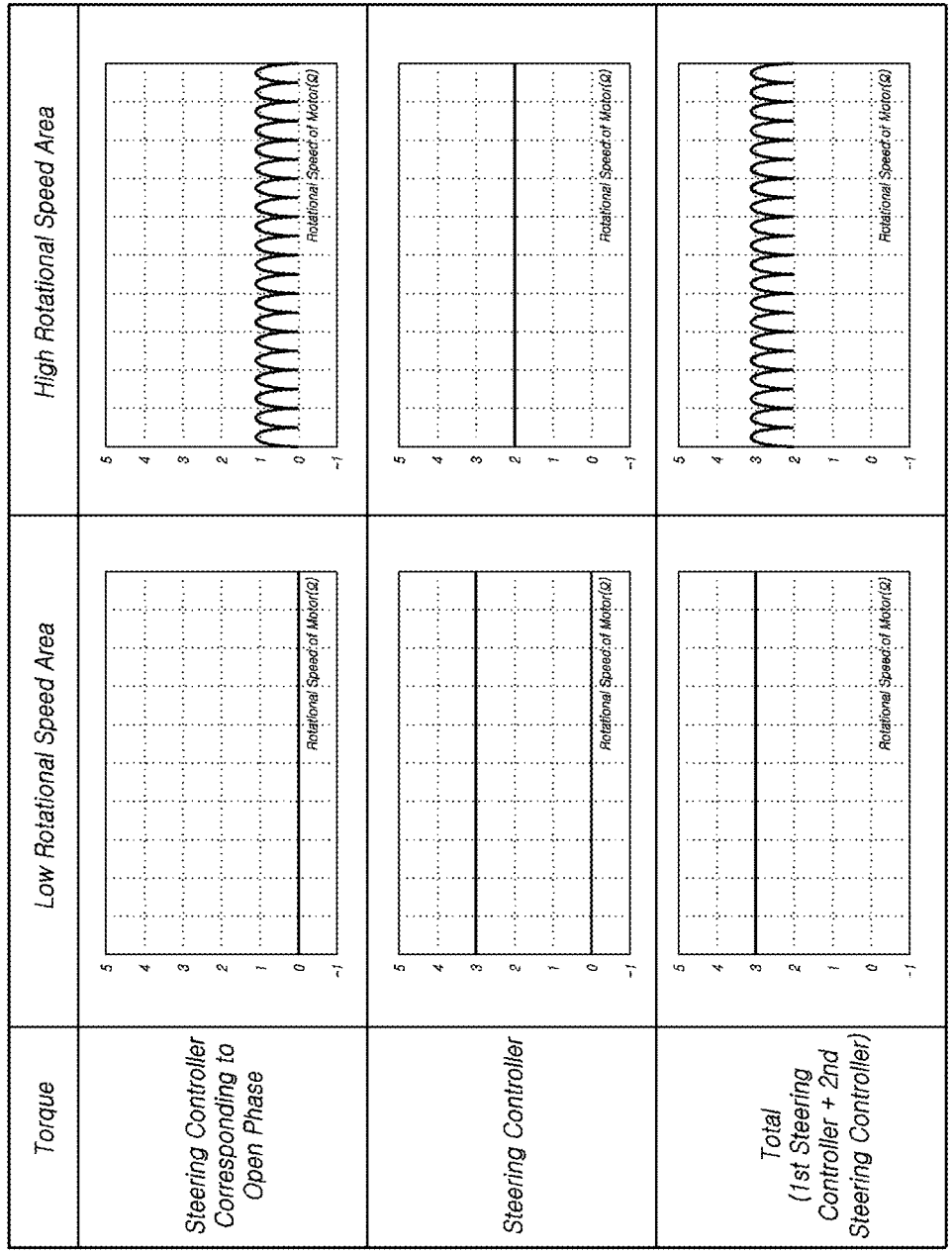
FIG. 5 is a diagram illustrating graphs torque generated by the steering motor over time in a low rotational speed range and a high rotational speed range according to an embodiment of the disclosure.

FIG. 4 is a graph illustrating torque generated by the steering motor in accordance with the rotational speed of the steering motor according to an embodiment of the disclosure, and FIG. 5 is a diagram illustrating graphs of torque generated by the steering motor over time in a low rotational speed range and a high rotational speed range according to an embodiment of the disclosure. Referring to FIGS. 4 and 5, the rotational speed of the steering motor is divided into the low rotational speed range and the high rotational speed range by a rotational speed at which the torque is reduced due to counter electromotive force of the steering motor.

Referring to FIG. 4, when the rotational speed of the steering motor is at point 410, i.e. to the left of a threshold value 300, the controller of the steering apparatus determines that the rotational speed of the steering motor is in the low rotational speed range. In this case, a torque value of the steering motor is a Nm. For example, the torque value a Nm may mean an output of the motor required for a predetermined level of steering in the operation of the steering motor. For example, a case in which the factor a is 3 may be taken. In this case, referring to FIG. 5, a torque value generated by the first steering controller, corresponding to one open phase, is zero (0), and a torque value generated by the second steering controller is 3 Nm. Thus, a final torque value generated by the steering motor is 3 Nm. In this case, a decrease in the output of the steering motor due to counter electromotive force of the steering motor does not occur, and thus, the steering motor can be actuated using the winding, the three phases of which are normal.

In FIG. 4, when the rotational speed of the steering motor is at point 420, i.e. to the right of the threshold value 300, the controller of the steering apparatus determines that the rotational speed of the steering motor is in the high rotational speed range. In this case, a torque value generated by the second steering controller has been reduced due to counter electromotive force of the steering motor. For example, the factor a is 3, a torque value generated by the second steering controller is 2 Nm. That is, the output of the steering motor is lower than an output of the steering motor required for a predetermined level of steering. Consequently, in the steering apparatus according to the disclosure, the controller may control the steering controller corresponding to the open phase so that the steering motor can use the remaining normal two phases of the winding corresponding to the open phase. In other words, as illustrated in FIG. 5, the steering controller corresponding to the open phase may cause the steering motor to generate torque having a maximum value 1, using the two remaining normal phases of the winding including the open phase. Accordingly, the steering apparatus according to the disclosure may generate final torque having a maximum value 3 Nm, as illustrated in the bottom right part of FIG. 5.

As described above, even in the case in which one phase of the three phases corresponding to one winding is open and only the other winding ordinarily operates, it is possible to assist in output power of the steering motor by preserving the torque value lost due to increases in the rotational speed of the steering motor, thereby improving steering stability.

Figure 6:
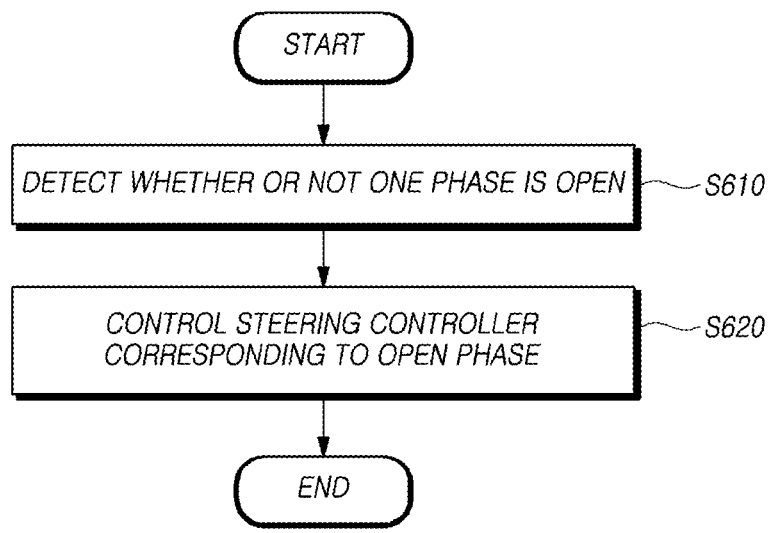
FIG. 6 is a flowchart illustrating a method according to an embodiment of the disclosure.

FIG. 6 is a flowchart illustrating a method according to an embodiment of the disclosure.

Referring to FIG. 6, the method performed by a steering apparatus according to the disclosure includes: a detection step of detecting whether or not any phase among three phases corresponding to each of a first winding and a second winding in a steering motor is open, the first winding and the second winding respectively receiving three-phase power; and a control step of, if one phase is detected to be open, controlling a steering controller corresponding to the open phase, among steering controllers controlling the power supplied to the first winding and the second winding, in accordance with an angular velocity of a steering wheel and a rotational speed of the steering motor, so that the steering motor can generate additional torque.

The steering apparatus according to the disclosure includes the steering motor including the first winding and the second winding receiving the three-phase power. The steering apparatus according to the disclosure includes a first steering controller controlling the power supplied to the first winding and a second steering controller controlling the power supplied to the second winding. Each of the first steering controller and the second steering controller are electrically connected to the steering motor. The first steering controller and the second steering controller may be directly connected to the steering motor or may be indirectly connected to the steering motor via a separate component protecting the steering motor, such as a circuit. The first steering controller and the second steering controller convert a DC voltage, input from a DC power source, into an AC voltage, by which the steering motor is actuated, and control the operation of the steering motor by the on/off operation of a plurality of semiconductor switching elements provided therein.

The steering apparatus according to the disclosure detects whether or not any phase among the three phases corresponding to each of the first and second windings is open in step S610. The steering apparatus may use a gate driver to detect whether or not each phase among the three phases corresponding to each of the first and second windings is open. For example, opening of one phase of the three phases may be a short-circuit of a coil corresponding on the one phase among a plurality of coils, or a short circuit of a line, through which power is supplied to the corresponding coil. However, the disclosure is not limited thereto. The technical concepts of the disclosure may be used in any situations in which power is not supplied since one or more phases in a three-phase circuit corresponding to the first winding or the second winding have failed.

If one phase among three phases is detected to be open, the steering apparatus according to the disclosure controls one steering controller corresponding to the open phase, among the first steering controller and the second steering controller, in accordance with an angular velocity of a steering wheel and the rotational speed of the steering motor, so that the steering motor can generate additional torque, in step S620.

If one phase among the three phases is detected to be open, the steering apparatus according to the disclosure may determine the winding corresponding to the open phase and specify the steering controller corresponding to the determined winding. Afterwards, the steering apparatus may review information regarding the angular velocity of the steering wheel and information regarding the rotational speed of the steering motor, and if the information regarding the angular velocity of the steering wheel and the information regarding the rotational speed of the steering motor satisfy specific conditions, control the steering controller corresponding to the open phase so that the steering motor can generate auxiliary torque.

According to an embodiment, if one phase among three phases is detected to be open, the steering apparatus according to the disclosure may determine a steering state in accordance with the angular velocity of the steering wheel. If the steering state is rapid steering, the steering apparatus may determine the rotational speed of the steering motor is in a high rotational speed range. If the rotational speed of the steering motor is determined to be in the high rotational speed range, the steering apparatus may control the steering controller corresponding to the open phase so that the steering motor can generate auxiliary torque.

In an example, the steering apparatus may determine that the steering state of the steering apparatus is rapid steering if the angular velocity of the steering wheel is higher than a first threshold value. Here, the first threshold value is a predetermined value. The steering apparatus may include an angular velocity sensor, which may obtain the angular velocity of the steering wheel by detecting an angular velocity applied to the steering wheel.

In another example, if the rotational speed of the steering motor is detected to be higher than a second threshold value, the steering apparatus according to the disclosure may determine that the rotational speed of the steering motor is in the high rotational speed range. If the rotational speed of the steering motor is detected to be not higher than a second threshold value, the steering apparatus according to the disclosure may determine the rotational speed of the steering motor to be in a low rotational speed range. The rotational speed of the steering motor may be obtained by calculating a pulse signal entering from a motor position sensor. The second threshold value serving as a reference, by which the high rotational speed range and the low rotational speed range are divided, may be set to be a value at which torque starts to be reduced due to counter electromotive force of the motor. For example, the second threshold value may be set to be a value of rated torque of the steering motor.

If the rotational speed of the steering motor is determined to be in the high rotational speed range, the steering apparatus may control the steering controller corresponding to the open phase so that the steering motor can generate additional torque using the remaining two phases, other than the open phase, among the three phases including the open phase. The magnitude of the additional torque generated by the steering motor may vary in accordance with the rotational speed of the steering motor. For example, the additional torque generated by the steering motor when the speed of the steering motor is 2000 rpm may be smaller than the additional torque generated by the steering motor when the speed of the steering motor is 2500 rpm.

According to an embodiment, the steering apparatus according to the disclosure controls the steering controller corresponding to the open phase so that the steering motor generates the additional torque in accordance with torque generated by the normal steering controller, other than the steering controller corresponding to the open phase, and the rotational speed of the steering motor. Here, the value of the additional torque may correspond to a value obtained by subtracting a torque value generated by the normal steering controller in the current rotational speed of the steering motor from a maximum torque value generated by the normal steering controller. In other words, the value of the additional torque added by the steering motor may be set to be the torque value reduced from the maximum torque value due to counter electromotive force of the steering motor.

According to the present disclosure, in a situation in which one phase among three phases of a steering motor including a plurality of windings is open, power is supplied to the steering motor using the remaining two phases among the three phases including the open phase, so that the steering motor can generate additional torque. Accordingly, even in the case in which power is supplied from a single winding, a torque value lost by an increase in the rotational speed of the steering motor can be preserved in order to assist in output power of the steering motor, thereby improving steering stability.

Figure 7:
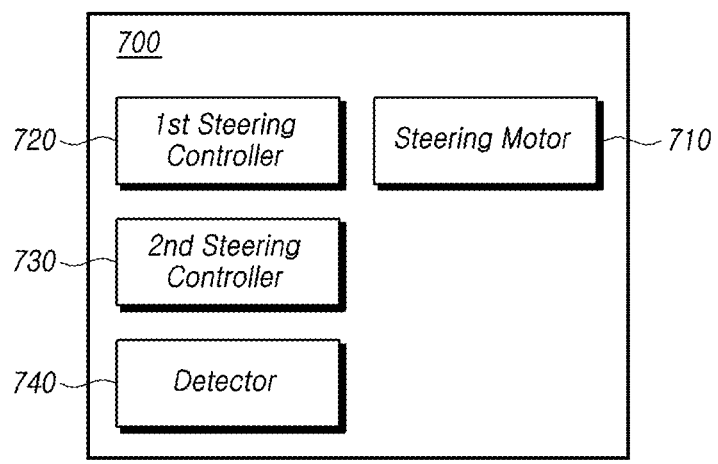
FIG. 7 is a block diagram illustrating a configuration of a steering apparatus according to an embodiment of the disclosure.

FIG. 7 is a block diagram illustrating a configuration of a steering apparatus according to an embodiment of the disclosure.

Referring to FIG. 7, the steering apparatus according to the disclosure 700 includes: a steering motor 710 including a first winding and a second winding respectively receiving three-phase power; a first steering controller 720 controlling the power supplied to the first winding; a second steering controller 730 controlling the power supplied to the second winding; and a detector 740 detecting whether or not any phase among three phases corresponding to each of the first and second windings is open. If one phase among the three phases is detected to be open, the steering controller corresponding to the open phase, among the steering controller and the second steering controller, controls the power supplied to the corresponding winding in accordance with an angular velocity of a steering wheel and a rotational speed of the steering motor so that the steering motor can generate additional torque.

The steering motor 710, the first steering controller 720, the second steering controller 730, and the detector 740, illustrated in FIG. 7, substantially correspond to the steering motor 110, the first steering controller the 120, the second steering controller 130, and the detector 140, illustrated in FIG. 1. Thus, detailed descriptions of the steering motor 710, the first steering controller 720, the second steering controller 730, and the detector 740, illustrated in FIG. 7, will be omitted, since they may be understood from the descriptions of the functions of the steering motor 110, the first steering controller the 120, the second steering controller 130, and the detector 140, illustrated in FIG. 1.

The function of the controller 150 in the steering apparatus, described with reference to FIG. 1, is performed by the steering controller 720 or the second steering controller 730 in FIG. 7. In other words, in the steering apparatus illustrated in FIG. 7, if one phase is detected to be open, the steering controller corresponding to the open phase may directly control the power supplied to the steering motor, so that the steering motor can generate additional torque.

Figure 8:
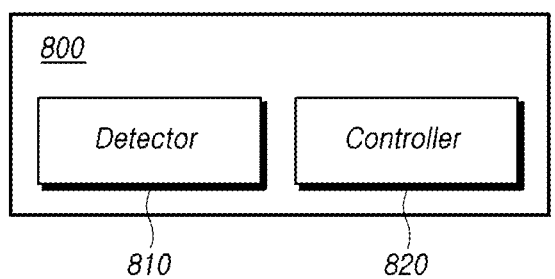
FIG. 8 is a block diagram illustrating a configuration of a steering control device according to an embodiment of the disclosure.

FIG. 8 is a block diagram illustrating a configuration of a steering control device according to an embodiment of the disclosure.

Referring to FIG. 8, the steering control device 800 according to the disclosure includes: a detector 810 detecting whether or not any phase among three phases corresponding to each of a first winding and a second winding in a steering motor is open, the first winding and the second winding respectively receiving three-phase power; and a controller 820, if one phase is detected to be open, controlling a steering controller corresponding to the open phase, among steering controllers controlling the power supplied to the first winding and the second winding, in accordance with an angular velocity of a steering wheel and a rotational speed of the steering motor, so that the steering motor can generate additional torque.

The steering control device 800 according to the disclosure is a control unit controlling a steering assistance function of a vehicle to provide steering torque using torque of the steering motor in order to assist in steering of the vehicle. For example, the steering control device may be a main control unit (MCU) of the vehicle, an electronic control unit (ECU) of the vehicle, or a central processing unit (CPU), or may mean some of functions of the MCU or the CPU. The steering control device may be configured to control the steering controllers connected to the steering motor.

The detector 810 and the controller 820 of the steering control device 800, illustrated in FIG. 8, may perform the functions of the detector 140 and the controller 150 of the steering apparatus 10, illustrated in FIG. 1, respectively. Accordingly, detailed descriptions of detector 810 and the controller 820 of the steering control device 800, illustrated in FIG. 8, will be omitted, since they may be understood from the descriptions of the functions of the detector 140 and the controller 150 of the steering apparatus 10, illustrated in FIG. 1.

Although the foregoing embodiments have been described in relation to the steering motor for illustrative purposes, the present disclosure is not limited thereto. The foregoing and other embodiments of the present disclosure may be applied to obtain the redundancy of a variety of dual winding motors having three or more phases, in addition to the steering motors, without departing from the technical concepts of the present disclosure.

The terms used herein, such as "system," "processor," "controller," "component," "module," "interface," "model," and "unit," may generally mean computer-related hardware entities, a combination of hardware and software, a software application, or a software application being executed. For example, the above-described components may be one selected from among, but are not limited to, processor-executable processes, a processor, a controller, a control processor, individuals, executable threads, a program, or a computer. For example, an application being executed by a controller or a processor, as well as the controller or the processor, may be a component. One or more components may be present in at least one of the processor or the execution thread. A component may be located in a single system or may be distributed across two or more systems.

The terms such as "including", "having", "containing", "constituting" "make up of", "formed of", and variations thereof used herein are generally intended to allow other components to be added unless the terms are used with the term "only". Unless otherwise specified, all terms including technical and scientific terms used herein have the same meaning as that commonly understood by those having ordinary knowledge in the technical field to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering apparatus comprising:
a steering motor including a first winding and a second winding respectively receiving three-phase power;
a first steering controller controlling the power supplied to the first winding;
a second steering controller controlling the power supplied to the second winding;
a detector detecting whether or not a phase among three phases corresponding to each of the first and second windings is open; and
a controller configured to, when the phase among the three phases is detected to be open, control one steering controller corresponding to the open phase, among the first steering controller and the second steering controller, in accordance with an angular velocity of a steering wheel and the rotational speed of the steering motor, so that the steering motor generates additional torque using remaining two phases other than the open phase among the three phases of one winding of the first and second windings which has the open phase.

2. The steering apparatus of claim 1, wherein the controller is configured to, when the phase among the three phases is detected to be open, control one steering controller corresponding to the open phase so that the steering motor generates output more than 50% of entire output power of the steering motor.

3. The steering apparatus of claim 1, wherein the controller is configured to, when the phase among the three phases is detected to be open, control one steering controller corresponding to the open phase so that an entire output power of the steering motor is greater than a power generated by a normal steering controller other than the steering controller corresponding to the open phase.

4. A steering apparatus comprising:
a steering motor including a first winding and a second winding respectively receiving three-phase power;
a first steering controller controlling the power supplied to the first winding;
a second steering controller controlling the power supplied to the second winding;
a detector detecting whether or not a phase among three phases corresponding to each of the first and second windings is open; and
a controller configured to, when the phase among the three phases is detected to be open, controls one steering controller corresponding to the open phase, among the first steering controller and the second steering controller, in accordance with an angular velocity of a steering wheel and the rotational speed of the steering motor, so that the steering motor generates additional torque,
wherein the controller determines a steering state in accordance with the angular velocity of the steering wheel if the phase is detected to be open, determines the rotational speed of the steering motor is in a high rotational speed range if the steering state is rapid steering, and controls the steering controller corresponding to the open phase so that the steering motor generates auxiliary torque if the rotational speed of the steering motor is determined to be in the high rotational speed range.

5. The steering apparatus according to claim 4, wherein, if the angular velocity of the steering wheel is higher than a first threshold value, the controller determines that the steering state of the steering apparatus is rapid steering.

6. The steering apparatus according to claim 4, wherein, if the rotational speed is higher than a second threshold value, the controller determines that the rotational speed of the steering motor is in the high rotational speed range.

7. The steering apparatus according to claim 6, wherein the second threshold value is set to be a value at which torque starts to be reduced due to counter electromotive force of the steering motor.

8. The steering apparatus according to claim 4, wherein, if the rotational speed of the steering motor is determined to be in the high rotational speed range, the controller controls the steering controller corresponding to the open phase so that the steering motor generates the additional torque using the remaining two phases, other than the open phase, among the three phases including the open phase.

9. The steering apparatus according to claim 8, wherein the controller controls the steering controller corresponding to the open phase so that the steering motor generates the additional torque in accordance with torque generated by the normal steering controller, other than the steering controller corresponding to the open phase, and the rotational speed of the steering motor.

10. The steering apparatus according to claim 9, wherein a value of the additional torque corresponds to a value obtained by subtracting a torque value at the rotational speed of the steering motor from a maximum torque value generated by the normal steering controller.

11. A method comprising:
   detecting whether or not a phase among three phases corresponding to each of a first winding and a second winding in a steering motor is open, the first winding and the second winding respectively receiving three-phase power; and
   when the phase is detected to be open, controlling a steering controller corresponding to the open phase, among steering controllers controlling the power supplied to the first winding and the second winding, in accordance with an angular velocity of a steering wheel and a rotational speed of the steering motor, so that the steering motor generates additional torque using remaining two phases other than the open phase among the three phases of one winding of the first and second windings which has the open phase.

12. The method according to claim 11, wherein the controlling of the steering controller comprises:
   if the phase among three phases is detected to be open, determining a steering state in accordance with the angular velocity of the steering wheel;
   if the steering state is rapid steering, determining the rotational speed of the steering motor is in a high rotational speed range; and
   if the rotational speed of the steering motor is determined to be in the high rotational speed range, controlling the steering controller corresponding to the open phase so that the steering motor generates auxiliary torque.

13. The method according to claim 12, wherein, in the controlling of the steering controller, if the angular velocity of the steering wheel is higher than a first threshold value, the steering state of the steering apparatus is determined to be rapid steering.

14. The method according to claim 12, wherein, in the controlling of the steering controller, if the rotational speed is higher than a second threshold value, the rotational speed of the steering motor is determined to be in the high rotational speed range.

15. The method according to claim 12, wherein, in the controlling of the steering controller, if the rotational speed of the steering motor is determined to be in the high rotational speed range, the steering controller corresponding to the open phase is controlled so that the steering motor generates the additional torque using the remaining two phases, other than the open phase, among the three phases including the open phase.

* * * * *